Patented Mar. 17, 1936

2,034,390

UNITED STATES PATENT OFFICE 2,034,390

BLUE, RED, AND BROWN METALLIZED ACID AZO DYES

Moses Leverock Crossley, Plainfield, and Lincoln Maurice Shafer, Highland Park, N. J., assignors to Calco Chemical Company, Inc., Bound Brook, N. J., a corporation of Delaware No Drawing. Application June 16, 1933,
Serial No. 676,090

13 Claims. (Cl. 260—12)

This invention relates to new blue, red, and brown acid azo dyes containing metals and particularly suitable for the production of fast tones of color on animal fibers.

It is known that acid dyes containing chromium and dyeing wool a violet color can be obtained by coupling 1-hydroxy-2-amino-4-methylbenzene-6-sulfonic acid with beta naphthol and then treating the resulting product with a chromium compound. We have now found that new, technically valuable, water soluble, metallized dyes, which dye animal fibers varied tones of blue, red and brown colors are produced when methyl substituted ortho-aminophenols containing a sulfonic acid group in position five are coupled with naphthols and substituted naphthols, and the resulting products subsequently treated with metallizing agents. The metals found to be particularly valuable for metallizing these dyes are chromium, copper, iron, aluminum, manganese, cobalt, nickel, vanadium, titanium and zirconium; or combinations of these. By using combinations of the above metals, the tone of the color produced can be varied within wide limits. Combinations particularly useful for the above purpose are; chromium-copper, manganese-copper, iron-copper, chromium-iron, and nickel-cobalt. The ratio of metal or metal complex to the dye may vary within wide limits, depending upon the nature of the metal and the nature and number of metallizable groups in the dye molecule.

The metallized dyes produced in accordance with this invention are formed by coupling, for example, 1-hydroxy-2-diazo-4-methylbenzene-5-sulfonic acid and 1-hydroxy-2-diazo-4-, 6-dimethylbenzene-5-sulfonic acid with phenols, naphthols, naphthol sulfonic acids, and β-hydroxy-naphthoic acids, or their derivatives, in alkaline media and subsequently treating the dyes so formed with a metallizing agent which will fix in the dye molecule in stable form one of the above mentioned metals or mixtures of metals. By introducing more than one metal in the molecule, the tone of the color can be varied within wide limits. The metallizing agent may be a water soluble salt of the metal or metals or an insoluble, freshly precipitated hydrate of the metal, and the metallization may be accomplished with or without the aid of solubilizing agents for the metallic compounds. In any case, soluble metallized dyes are produced. They are salted out with sodium chloride or ammonium sulfate, filtered, and dried. The dyes thus produced are dark colored powders, which are quite soluble in water. They dye animal fibers fast tones of blue, red and brown colors. The metal is firmly bound in the dye molecule and is not precipitated when aqueous solutions of the dyes are treated with alkalies.

The new products may be characterized by the following structural formula:

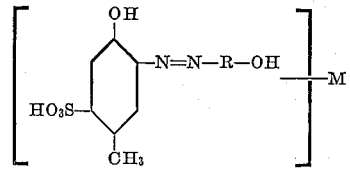

where R is an aryl nucleus and the OH group attached thereto is ortho to the azo group, and M represents one or more of the metals mentioned above. The number of metal atoms may vary within wide limits from a fraction of an atom to each dye molecule up to several such atoms. Various substituent groups may be inserted on the rings such as $CH_3$, $C_2H_5$, $COOH$, $Cl$ and many others.

The following examples are given to illustrate the invention. They do not limit its scope. The parts given are by weight.

*Example 1*

Dissolve 15 parts of beta naphthol in 50 parts of water, add 4 parts of caustic soda, heat the mixture to bring about solution, and then add 250 parts of water and 6 parts of calcium hydroxide. Mix 20 parts of 1-hydroxy-2-amino-4-methylbenzene-5-sulfonic acid with 350 parts of water, add 5 parts of caustic soda and stir until solution is complete. Cool to about 5° C. Add 12 parts of real hydrochloric acid and diazotize with 7 parts of sodium nitrite. Add the diazo solution to the naphthol solution and stir until coupling is complete. Then heat the reaction mixture to 45° C. Add 30 parts of concentrated hydrochloric acid and salt out the dye by adding an amount of sodium chloride equal to 20% of the volume. Filter the dye paste and suspend it in 400 parts of water, add 4 parts of sodium acetate and 25 parts of chromium chloride, boil the mixture for several hours, cool and salt out with sodium chloride. Filter and dry the dye. A dark colored powder is obtained which is quite soluble in water and which dyes animal fibers a dark navy blue color of exceptional fastness.

*Example 2*

0.1 mole of the dye obtained in Example 1, prior to metallization, is suspended in 600 parts of water and treated with 15 parts of sodium acetate and 25 parts of copper sulfate. The mixture is boiled for several hours and the dye salted out with sodium chloride. It is filtered and dried. A dark colored powder is obtained which is soluble in water and which dyes animal fibers a bluish red color of exceptional fastness.

*Example 3*

0.1 mole of the dye obtained in Example 1, prior to metallization, is suspended in 500 parts of water and treated with 15 parts of sodium acetate, 10 parts of chromium chloride and 10 parts of copper sulfate crystals. The mixture is boiled for several hours and the dye salted out with sodium chloride. The dye is filtered and dried. It is a dark colored powder, soluble in water and produces on animal fibers dark blue to violet colors of excellent fastness. The copper and chromium may be replaced by other combinations of the metals mentioned above and similar dyes are obtained which are capable of producing on animal fibers varied tones of blue, red and brown colors of excellent fastness.

*Example 4*

Dissolve 20 parts of 1-hydroxy-2-amino-4-methylbenzene-5-sulfonic acid in 350 parts of water containing 5 parts of caustic soda, add 15 parts of real hydrochloric acid and diazotize with 7 parts of sodium nitrite. Add the diazo solution to a previously cooled solution containing 21 parts of 2-naphthol-6-sulfonic acid and 5 parts of caustic soda in 300 parts of water. Stir until coupling is complete. Salt out the dye with sodium chloride, filter, suspend in 600 parts of water, add 15 parts of ammonium sulfate and 14 parts of chromium chloride. Boil for several hours, filter, and dry. The product is a dark colored powder, soluble in water, and dyes animal fibers dark blue tones of excellent fastness.

2-naphthol-7-sulfonic acid or 1-naphthol-5-sulfonic acid may be substituted for the 2-naphthol-6-sulfonic acid, and cobalt, copper, or any one of the other metals mentioned above, or combinations of said metals, may be substituted for the chromium and similar dyes are thus obtained which are capable of producing on animal fibers varied hues of excellent fastness.

*Example 5*

Dissolve 15 parts of beta naphthol in 300 parts of water, add 5 parts of caustic soda and heat to insure complete solution, then add 6 parts of calcium hydroxide and cool the mixture to 5° C. Diazotize 22 parts of 1-hydroxy-2-amino-4, 6-dimethylbenzene-5-sulfonic acid in 350 parts of water with 12 parts of real hydrochloric acid and 7 parts of sodium nitrite, the solution having been cooled to about 5° C. with ice. Add the diazo solution gradually to the beta naphthol solution and stir until coupling is complete. Heat the solution to about 45° C., salt out the dye with sodium chloride, filter and redissolve the precipitate in about 800 parts of water. Add 10 parts of sodium acetate and 15 parts of chromium chloride and boil the mixture for several hours. Cool and salt out with sodium chloride. Filter and dry the resulting product. A dark colored powder is obtained. It is extremely soluble in water and dyes animal fibers a greenish tone of navy blue of excellent fastness. The beta naphthol may be replaced by 2-naphthol-7-sulfonic acid, 2-naphthol-6-sulfonic acid, or 1-naphthol-5-sulfonic acid, and the chromium may be substituted by copper, iron, cobalt, nickel, titanium and zirconium, and similar dyes produced. These products dye animal fibers varied hues of excellent fastness.

Although we have described our invention setting forth a few specific examples of the products coming within the scope thereof, it is to be understood that the examples were given for the purpose of illustration and they do not define the limits of the invention. Many dyes of various chemical constitutions and of various colors and shades may be made by variations in the ingredients used, the conditions of the reaction, the number and nature of the metals, and the like, within the spirit of the invention. For example, our invention includes a compound having most probably the following structural formula:

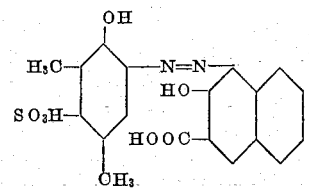

which may be metallized with copper, being a dark powder, soluble in water and dyeing animal fibers a bluish tone of red of excellent fastness.

Another compound is the chromium derivative of the following dye:

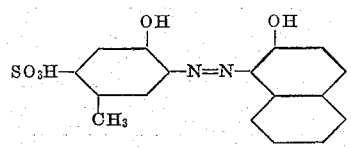

which is a dark colored, water-soluble powder dyeing animal fibre a blue color of excellent fastness.

These and other variations may be made in our invention, the scope of which is set forth in the claims appended hereto.

In the claims the term "metallized dyes" is used to cover dyes in which metal has been introduced into the dye molecule before the latter is dyed on a fiber. The term does not include dyes which are dyed on the fiber and then after treated with an oxidizing metal compound such as, for example, a chromium compound.

What we claim is:

1. As new products, metallized dyes having the following structural formula:

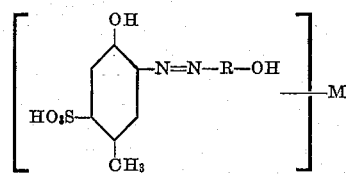

in which R is a naphthyl nucleus and M represents at least one metal of the group consisting of chromium, copper, iron, aluminum, manganese, cobalt, nickel, vanadium, titanium, zirconium.

2. As new products, metallized dyes comprising two hydroxy aryl nuclei linked by an azo group, one of the nuclei being mononuclear and one of said nuclei being a naphthol, at least one OH group on each nucleus being ortho to the azo group and a sulfonic acid group on the mononuclear nucleus meta to the OH group and para to the azo group.

3. As new products, metallized dyes comprising a hydroxybenzene nucleus and a naphthol nucleus linked by an azo group, each nucleus having at least one OH group ortho to the azo group, and a sulfonic acid group in position 5 on the benzene nucleus.

4. As new products, metallized dyes from the products obtained by coupling an orthoaminophenol containing a sulfonic acid group in position 5 with a naphthol, the product being soluble in water and dyeing animal fibers varied tones of blue, red and brown colors of excellent fastness.

5. As new products, metallized dyes obtained by treating azo products produced by coupling a naphthol with a methylorthoaminophenol containing a sulfonic acid group in position 5 with metallizing agents capable of introducing at least one of the metals from the group consisting of chromium, copper, iron, aluminum, manganese, cobalt, nickel, vanadium, titanium, zirconium, the resulting products being soluble in water and dyeing animal fibers varied tones of blue, red and brown colors of excellent fastness.

6. As new products, metallized dyes obtained from an azo dye produced by coupling 1-hydroxy, 2-diazo, 4-methyl benzene, 5-sulfonic acid with a beta naphthol, the dyes being soluble in water and dyeing animal fibers varied tones of blue, red and brown colors of excellent fastness.

7. As new products, metallized dyes derived from the product obtained by coupling 1-hydroxy, 2-diazo, 4-methyl benzene, 5-sulfonic acid with beta naphthol, the dyes being soluble in water and dyeing animal fibers varied tones of blue, red and brown colors of excellent fastness.

8. As new products, metallized dyes derived from azo dyes produced by coupling a diazotized methyl-ortho-amino-phenol and a beta hydroxy naphthoic acid, the resulting products being soluble in water and dyeing animal fibers varied tones of blue, red and brown colors of excellent fastness.

9. As new products, metallized dyes obtained from the azo dye produced by coupling 1-hydroxy, 2-diazo, 4-methyl benzene, 5-sulfonic acid with a naphthol sulfonic acid, the products being soluble in water and dyeing animal fibers varied tones of blue, red and brown colors of excellent fastness.

10. As new products, metallized dyes derived from the product obtained by coupling 1-hydroxy, 2-diazo, 4,6-dimethyl benzene, 5-sulfonic acid with a beta naphthol, the resulting products being soluble in water and dyeing animal fibers varied tones of blue, red and brown colors of excellent fastness.

11. As a new product, the chromium compound of the dye having the following structural formula:

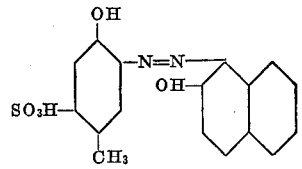

which is a dark-colored powder soluble in water and dyes animal fibers a blue color of excellent fastness.

12. As a new product, the copper compound of the dye having the following structural formula:

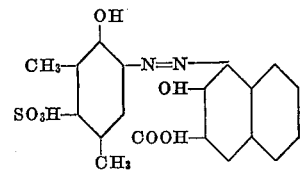

which is a dark powder soluble in water and dyeing animal fibers a bluish tone of red of excellent fastness.

13. As new products, metallized dyes having the following structural formula:

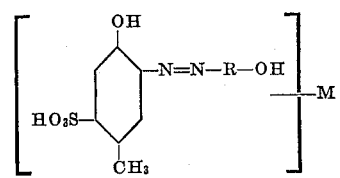

in which R is a naphthyl nucleus and M represents a combination of two metals of the group consisting of chromium, copper, iron, aluminum, manganese, cobalt, nickel, vanadium, titanium and zirconium.

MOSES L. CROSSLEY.
LINCOLN M. SHAFER.